United States Patent [19]
Nakamura

[11] Patent Number: 5,082,016
[45] Date of Patent: Jan. 21, 1992

[54] ADHESION PREVENTION DEVICE IN LIQUID SURFACE DETECTING VALVE

[75] Inventor: Hideyo Nakamura, Ibaraki, Japan

[73] Assignee: Kyosan Denki Kabushiki Kaisha, Ibaraki, Japan

[21] Appl. No.: 632,375

[22] Filed: Dec. 21, 1990

[30] Foreign Application Priority Data

Dec. 22, 1989 [JP] Japan ................ 1-147028

[51] Int. Cl.$^5$ .................... F16K 17/00; F16K 31/22
[52] U.S. Cl. ......................... 137/202; 137/433
[58] Field of Search ............ 137/202, 196, 433, 450; 251/282

[56] References Cited

U.S. PATENT DOCUMENTS

| | | | |
|---|---|---|---|
| 3,162,209 | 12/1984 | Gaines | 137/450 X |
| 4,164,955 | 8/1979 | Allen | 137/450 X |
| 4,376,446 | 3/1983 | Liff | 137/202 |
| 4,781,218 | 11/1988 | Mori | 137/202 |
| 4,982,757 | 1/1991 | Ohasi | 137/202 |

*Primary Examiner*—Alan Cohan
*Attorney, Agent, or Firm*—Flynn, Thiel, Boutell & Tanis

[57] ABSTRACT

A first port is provided in a fuel tank of an automobile for introducing an open air therefrom when the liquid surface of fuel lowers in the fuel tank. There is provided a float in the fuel tank which is detached from a second port when the liquid surface is under a predetermined level in the fuel tank but closes the second port when the liquid surface exceeds the predetermined level for preventing the fuel from overflowing the first port. There are provided a diaphragm and a rod to be operated by the diaphragm inside the float for preventing the float being kept adhered to the second port by pushing back the diaphragm by the rod.

4 Claims, 3 Drawing Sheets

ADHESION PREVENTION DEVICE IN LIQUID SURFACE DETECTING VALVE

BACKGROUND OF THE INVENTION

1. Field of the Invention

The present invention relates to a valve device provided with a liquid surface detecting valve employed in a fuel tank, particularly to an adhesion prevention device in a liquid surface detecting valve.

2. Prior Art

In a fuel tank in an automobile the fuel level in the fuel tank is liable to rise suddenly locally in the fuel tank when the automobile starts or stops suddenly or runs on a bad road or on a sloping road, which entails the overflow of the fuel from the fuel tank. A liquid surface detecting valve is provided for preventing the fuel from overflowing a predetermined level of the fuel in the fuel tank.

A conventional liquid surface detecting valve is described with reference to FIG. 3.

A valve casing 3 is fixed to an upper casing 2 of a fuel tank 1. A float chamber 4 is provided in the valve casing 3. The float chamber 4 has openings 6 at a bottom wall 5 thereof for communicating with the fuel in the fuel tank 1 and a valve seat 8 at an upper wall 7 thereof. The float chamber 4 has a float 9 at the inner space thereof which float 9 has a valve 10 at the upper surface thereof. A valve port 11 is disposed at the upper wall 7 over the valve 10 for communicating with the inner space of the float chamber 4 and a port 12 defined over the float chamber 4. The valve seat 8 is provided around the valve port 11.

The valve casing 3 has a by-pass port 13 at the portion opposite the port 12 for communicating with the port 12 and the space in the fuel tank 1. A spring 15 is provided over the by-pass port 13 for urging a relief valve 14 toward the by-pass port 13 so that the relief valve 14 closes the by-pass port 13.

An operation of the conventional liquid surface detecting valve will be described hereinafter.

When the fuel reaches the predetermined level in the fuel tank, the float 9 in the float chamber 4 rises so that the valve 10 seats on the valve seat 8, thereby closing the valve port 11. Consequently, the fuel is prevented from overflowing the fuel tank 1.

When the fuel lowers from the predetermined level, the float 9 lowers so that the valve port 11 is open. Hence, the pressure in the fuel tank 1 is maintained at all times within a predetermined value of pressure.

If the valve 10 of the float 9 is adhered to the valve seat 8 and does not move away or drop from the valve seat 8, the pressure in the fuel tank 1 increases, thereby causing a fuel vapor system to be inconvenient or troublesome or the fuel tank 1 to be deformed. In such a case, the relief valve 14 rises upward against the resilient force of the spring 15 for opening the by-pass port 13 so that the fuel vapor escapes through the port 12 and a canister, not shown, to the atmosphere, whereby the pressure in the fuel tank 1 is controlled under the predetermined value of the pressure.

However, there is a likelihood that the valve 10 will adhere to the valve seat 8 for a long time, whereby the liquid surface detecting valve loses its function. There is also a likelihood that the relief valve 14 will adhere to the by-pass port 13, whereby no adjustment of the pressure is made by the relief valve 14. As a result, there arises the inconvenience of the fuel vapor system or deformation of the fuel tank 1.

SUMMARY OF THE INVENTION

It is therefore an object of the invention to provide an adhesion prevention device in a liquid surface detecting valve capable of preventing a valve of a float from adhering to a valve seat and making it possible to omit a relief valve.

To achieve the above object, the adhesion prevention device in the liquid surface detecting valve according to the present invention comprises a valve casing fixed to a fuel tank, a float chamber provided at the valve casing, a float disposed in the float chamber and provided with a valve, and a valve port provided on the valve casing. The adhesion prevention device of the liquid surface detecting valve further comprises a diaphragm chamber defined in the float, a diaphragm for partitioning the diaphragm chamber and a rod provided on the diaphragm and penetrating the valve of the float characterized in that the tip end of the rod is brought into contact with the valve casing when the pressure in the fuel tank 1 increases at the state where the valve closes the valve port, whereby the fuel vapor pressure influences the float so that the valve is prevented from keeping adhered to the valve seat.

The above and other objects, features and advantages of the present invention will become more apparent from the following description taken in conjunction with the accompanying drawings.

DESCRIPTION OF THE PREFERED EMBODIMENT

Figure 1:
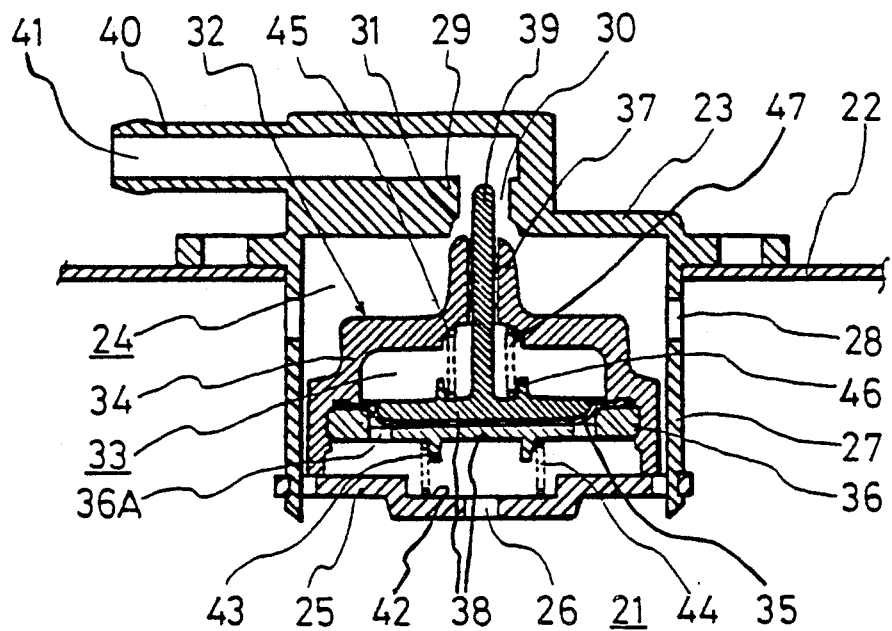
FIG. 1 is a cross sectional view of an adhesion prevention device in a liquid surface detecting valve according to a preferred embodiment of the present invention.

An adhesion prevention device in liquid surface detecting valve according to a preferred embodiment of the present invention will be described with reference to FIGS. 1 to 3.

A valve casing 23 of a liquid surface detecting valve is fixed to an upper casing 22 of a fuel tank 21. There is provided a float chamber 24 in the valve casing 23. The float chamber 24 has openings 26 at a bottom wall 25 thereof and openings 28 at side walls 27 thereof. The float chamber 24 further has a float 32 in the space thereof and a valve port 30 at an upper wall 29 thereof which port 30 has a valve seat 31 at the periphery thereof.

A diaphragm chamber 33 is defined inside the float 32 and comprises a diaphragm 35 and a bowl-shaped float casing 34 composed of an upper portion having a small diameter and a lower portion having a large diameter. The diaphragm 35 is fixed to the lower portion of the float casing 34 by a disk-shaped fastening member 36. A plurality of openings 36A are provided circumferentially adjacent to an outer periphery of the fastening member 36. A valve 37 is protruded from the upper surface of the float casing 34. A disk body 38 contacts the upper surface of the diaphragm 35. The upper portion of the disk body 38 has a rod 39 which penetrates the valve 37.

A pipe portion 40 is defined over the valve casing 23 and a port 41 defined at one end of the pipe portion 40 communicates with the valve port 30. A recess 42 is defined at the central portion of the bottom wall 25. The lower surface of the fastening member 36 has an annular projection 43. A spring 44 is disposed between the recess 42 and the projection 43. A recess 45 is defined inside the float casing 34 and an annular projection 46 is protruded from the upper surface of the disk body 38. A spring 47 is disposed between the recess 45 and the projection 46. The spring 44 presses the the fastening member 36 upwardly under a predetermined urging force, thereby assisting the buoyancy of the float 32.

The operation of the adhesion prevention device in the liquid surface detecting valve having such an arrangement will be described with reference to FIGS. 2(a) and 2(b).

Figure 2A:
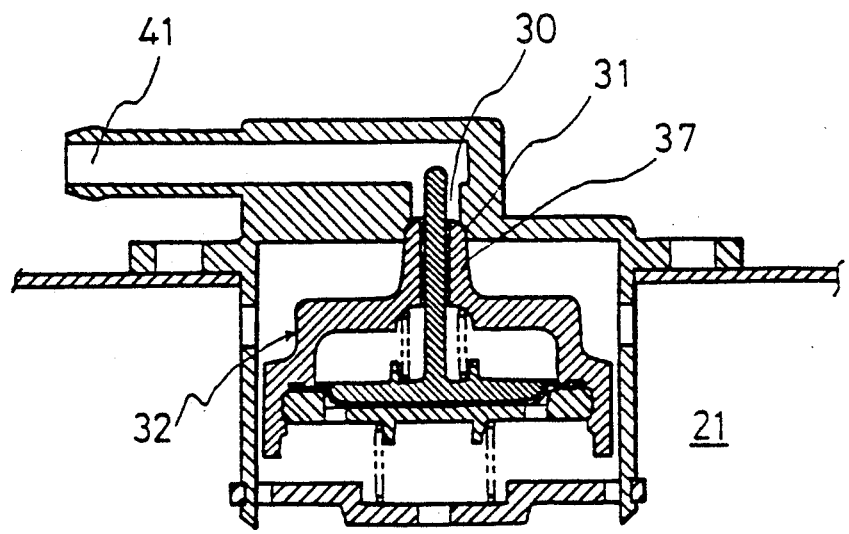
FIGS. 2(a) and 2(b) are views explaining respectively operations of the adhesion prevention device in the liquid surface detecting valve of FIG. 1.

A state where the liquid level of the fuel in the fuel tank 1 is under the float 32 is illustrated in FIG. 1. When the liquid level in the fuel tank 1 rises from the state as illustrated in FIG. 1, the float 32 floats as illustrated in FIG. 2(a) wherein the valve 37 of the float 32 closes the valve port 30. Accordingly, the fuel is blocked from flowing through the valve port 30 and the port 41 which prevents overflow of the fuel from the fuel tank 1.

At the state where the valve 37 closes the valve port 30 and the valve 37 is seated on the valve seat 31, the float 32 may not drop from the valve seat 31 even if the liquid level lowers. As a result, the fuel tank is made airtight and the fuel vapor is sealed inside the fuel tank 21.

Figure 2B:
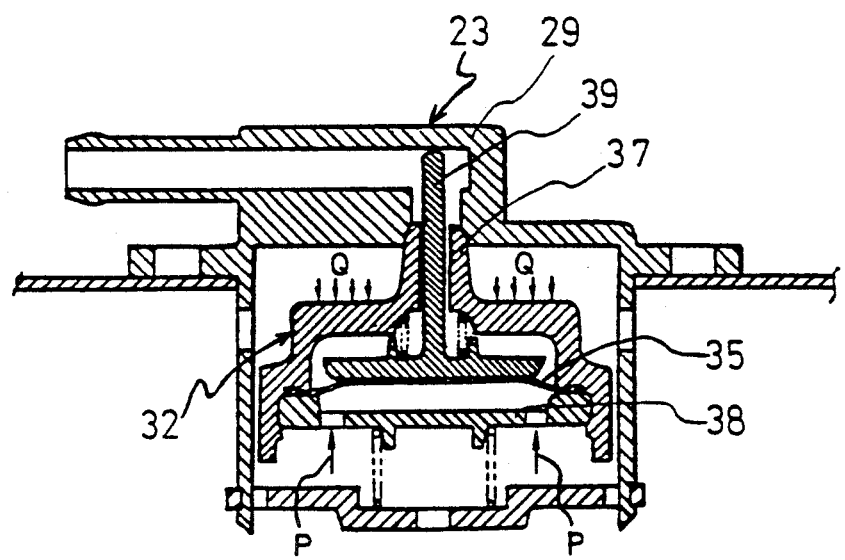
Figure 3:
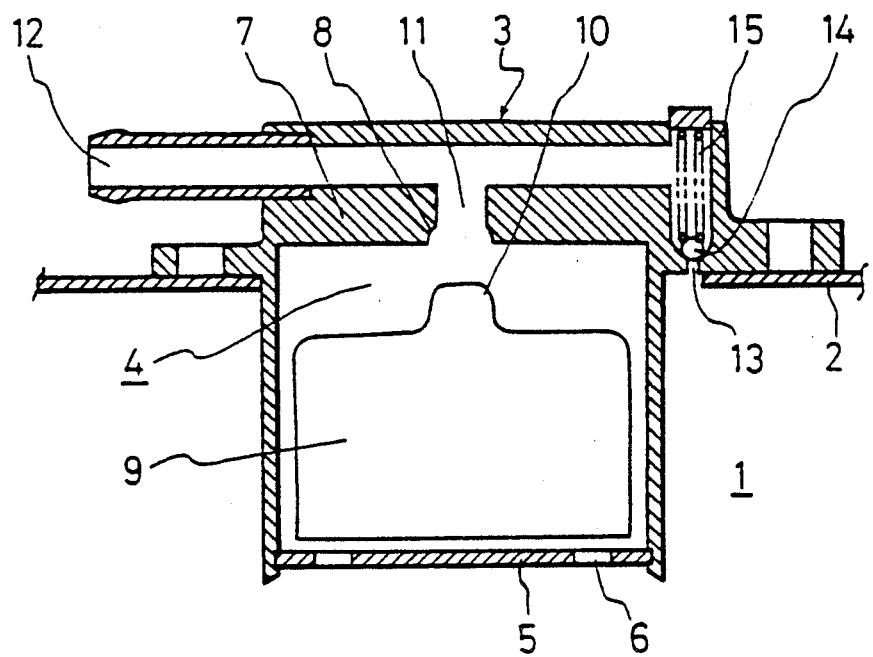
FIG. 3 is a cross sectional view showing a conventional adhesion prevention device in a liquid surface detecting valve.

When the pressure of the fuel vapor sealed inside the fuel tank 21 is increased by the increase of the temperature, the pressure of the fuel vapor denoted at P as shown in FIG. 2(b) influences the diaphragm 35, whereby the disk body 38 and the rod 39 rise. Thereafter, the tip end of the rod 39 is brought into contact with the upper wall of the valve casing 23 as illustrated in FIG. 2(b). At this stage, the diaphragm 35 cannot rise farther and the pressure P influences only a relatively small annular area of the float 32, but the vapor pressure Q, which is directed opposite to the vapor pressure P, influences a relatively large area of the upper surface of the float 32 and urges it downwardly. The intensity of the vapor pressure Q is substantially the same as that of the vapor pressure P but the vapor pressure Q influences the float 32 is the opposite direction compared to the vapor pressure P and vapor pressure Q is effective over a larger area. The valve 37 is prevented from keeping adhered to the valve seat 31 due to the influence of the vapor pressure Q, hence the float 32 drops from the valve seat 31.

With the arrangement of the adhesion prevention device in liquid surface detecting valve set forth above, there is such an effect that the liquid surface detecting valve is prevented from keeping adhered to the valve seat when the vapor pressure is sealed inside the fuel tank, the pressure in the fuel tank is prevented from increasing whereby the inconvenience of the fuel vapor system is prevented and the deformation of the fuel tank is prevented.

Although the invention has been described in its preferred form with a certain degree of paticularity, it is to be understood that many variations and changes are possible in the invention without departing from the scope thereof.

What is claimed is:

1. An adhesion prevention device in liquid surface detecting valve comprising a valve casing fixed to a fuel tank, a float chamber provided at the valve casing, a float disposed in the float chamber and provided with a valve, a valve port provided on the valve casing, a diaphragm chamber defined in the float, a diaphragm for partitioning the diaphragm chamber and a rod provided on the diaphragm and penetrating the valve of the float, the tip end of the rod being brought into contact with the valve casing when the pressure in the fuel tank increases in the state wherein the valve closes the valve port.

2. A liquid surface detecting valve adapted to be disposed in a fuel tank of a vehicle to prevent liquid fuel from overflowing from the fuel tank, comprising:
 a valve casing adapted to be fixed to the fuel tank, said valve casing having a float chamber therein, said valve casing having inlet opening means in fluid flow communication with said float chamber and having a discharge opening extending from said float chamber above said inlet opening means;
 a float comprising a float body disposed in said float chamber for floating therein in response to the entry of liquid fuel into said float chamber, said float having a valve above said float body and adapted to sealingly engage said discharge opening when said float rises in said float chamber and moves said valve toward said discharge opening, said float having a diaphragm mounted therein for limited movement relative to said float body, and a rod connected to said diaphragm and extending upwardly through said float body and penetrating said valve so that said rod can be moved upwardly by said diaphragm when said valve sealingly engages said discharge opening.

3. A valve according to claim 2, wherein springs are disposed in a space defined between said diaphragm and a top wall of said float body and in a space defined between said diaphragm and a bottom wall of said float chamber.

4. A valve as claimed in claim 2, wherein said float body has an internal diaphragm chamber which is divided by said diaphragm into an upper sealed diaphragm chamber portion and a lower diaphragm chamber portion which is open to said inlet opening means, said float body having an upper wall which is spaced downwardly from the upper wall of said valve casing when said valve sealingly engages said discharge opening to define an upper cavity in said float chamber, said inlet opening means communicating with said upper cavity so that fluid pressure in said upper cavity urges said float downwardly in said float chamber; a first spring disposed between said diaphragm and said upper wall of said float body for resiliently urging said diaphragm downwardly relative to said upper wall and a second spring disposed between the lower side of said float body and the lower wall of said valve casing for resiliently urging said float body upwardly in said valve casing, said valve casing having a wall for engaging the upper end of said rod when said valve closes said discharge opening and the fluid pressure in the fuel tank increases.

* * * * *